US008314363B2

(12) United States Patent
Doerrie

(10) Patent No.: US 8,314,363 B2

(45) Date of Patent: Nov. 20, 2012

(54) HEATING SYSTEM OF A MOTOR VEHICLE

(75) Inventor: Christian Doerrie, Herxheim (DE)

(73) Assignee: BorgWarner BERU Systems GmbH, Ludwigsburg (DE)

( * ) Notice: Subject to any disclaimer, the term of this patent is extended or adjusted under 35 U.S.C. 154(b) by 393 days.

(21) Appl. No.: 12/779,811

(22) Filed: May 13, 2010

(65) Prior Publication Data

US 2010/0288744 A1 Nov. 18, 2010

(30) Foreign Application Priority Data

May 14, 2009 (DE) ......................... 10 2009 021 309

(51) Int. Cl.
*B60L 1/02* (2006.01)

(52) U.S. Cl. ....................................................... 219/202

(58) Field of Classification Search ................... 219/202
See application file for complete search history.

(56) References Cited

U.S. PATENT DOCUMENTS 7,148,453 B2 * 12/2006 Bohlender et al. ............ 219/491
2008/0173628 A1 7/2008 Dorrie et al.

FOREIGN PATENT DOCUMENTS

DE 198 59 740 A1 6/2000
JP 07161406 A 6/1995
JP 2001-076805 A 3/2001

* cited by examiner

*Primary Examiner* — Anthony Ho

(57) ABSTRACT

The invention relates to a motor vehicle heating system comprising a heater (1) that has a heater core (2), through which a fluid flow to be heated can flow and which comprises a plurality of heating elements, and a top part (6) which is placed on the heater core (2) and forms a receptacle for a plug-in connector (10), and comprising a plug-in connector (10) that fits the top part and is used to connect the heater (1) to the electrical system of a motor vehicle, wherein the plug-in connector (10) includes a plurality of contacts, which are situated in a row, for contacting contacts (7) of the heater (1). According to the invention, the plug-in connector (10) includes a plurality of housings (12), each of which encloses one or two contacts of the plug-in connector (10), wherein the housings (12) are interconnected by mechanical adapter elements (13) which enable adjacent housings (12) to be moved toward one another or away from one another to adapt to the position of the contacts (7) of the heater (1).

9 Claims, 6 Drawing Sheets

HEATING SYSTEM OF A MOTOR VEHICLE

The invention is directed to a motor vehicle heating system having the features indicated in the preamble of claim 1. A system of this type is known from DE 10 2008 003 867 A1.

Motor vehicle heating systems have a heater core, through which a fluid flow to be heated can flow, and contain a plurality of heating elements. The heater core has a top part that includes a receptacle for a plug-in connector for connecting the heater to the electrical system of a motor vehicle. The plug-in connector, in combination with the vehicle heater, forms a motor vehicle heating system.

In the motor vehicle heating system known from DE 10 2008 003 867 A1, the heater core is formed by an extruded part. Motor vehicle heating systems are also known in which the heater core is formed by tubes that contain heating elements and onto which fins for heat dissipation are slid, or in which heating elements are clamped between corrugated fins.

To ensure that the plug-in connector can be inserted easily into the receptacle provided therefor during installation of a motor vehicle heater, narrow tolerances regarding the position of the connection contacts must be maintained during manufacture of the heater. Maintaining compliance with required manufacturing tolerances is an elaborate undertaking, in particular for heater cores that include an extruded part as the heat exchanger.

An object of the present invention is to find a way to simplify the manufacture of a motor vehicle heating system of the type referred to initially, and to simplify its installation in a motor vehicle.

This object is solved by a motor vehicle heating system having the features indicated in claim 1. Advantageous developments of the inventions are the subject matter of dependent claims.

In the case of conventional motor vehicle heating systems, the positions of the individual contacts of the plug-in connector are rigidly defined by the housing of the plug-in connector, but, in the case of the plug-in connector of a system according to the present invention, every individual housing encloses one or two contacts. The housings are interconnected by mechanical adapter elements which enable the housings to be moved toward one another to adapt to the position of the contacts of the heater.

When the heater is installed in a motor vehicle, the contacts of the plug-in connector, or the housings of the plug-in connector can therefore be displaced relative to each other to adapt to the position of the electrical connection contacts of the heater, namely by compressing the adapter elements to reduce the distance between adjacent housings, or by extending them, to increase the distance. Advantageously, larger tolerances can therefore be permitted in the manufacture of the heater, in particular the heater core, and the insertion of the plug-in connector into the intended receptacle in the heater is simplified.

In a heating system according to the present invention, deviations in the distance between adjacent contacts of the heater can be compensated for by moving adjacent housings of the plug-in connector toward one another or away from each other, thereby increasing or reducing the distance between the housings as needed. Advantageously, the adapter elements of the plug-in connector may also be used to implement a deviation of the housing positions from a straight linear connection e.g. such as a lateral displacement or a rotation.

If the motor vehicle heating system is to be used as a high-voltage heating system, it is advantageous for each housing of the plug-in connector to enclose two contacts, namely one contact that connects to potential, and one contact that connects to ground. In motor vehicle heating systems that are to be operated using typical vehicle electrical supply voltages of e.g. 12 V for passenger vehicles and 24 V for trucks, a ground connection is preferably established using the heater core. As a result, one or more ground connections can be realized independently of the potential connections, for example. In the case of motor vehicle heating systems that are to be operated using typical vehicle electrical system voltages of less than 42 V, each of the contacts of the plug-in connector is therefore preferably enclosed individually by a housing. In particular, all contacts of the plug-in connector can be used as potential connections, and a ground connection can be established separately e.g. using a Radsock contact, as described in DE 10 2008 003 867 A1.

Mechanical adapter elements that enable the housings of the plug-in connector to perform adaptive motions relative to one another can be designed e.g. such that housings, which are situated in a row, of the contacts of the plug-in connector are interconnected by segments that include at least one section that extends transversely to the direction defined by the row. Due to a segment section that extends transversely to the row, that is, transversely to the connection direction of adjacent housings, the distance between the individual housings can be reduced or increased slightly when installing the motor vehicle heating system using minimal force and without causing damage, thereby ensuring adaptation to the position of the connection contacts of a given heater.

A segment section that extends transversely to the connection direction can be realized e.g. using a C-shaped or V-shaped section. Advantageously, an adapter element can include two C-shaped or V-shaped sections. For example, two C-shaped sections, which are rotated by 180°, can be situated one behind the other and in this manner form a S-shaped section. A further possibility is to situate two C-shaped or V-shaped sections next to one another so that they enclose a recess. In this case, the segment therefore forms a fork, and the two resultant segment sections initially extend away from each other and then reconnect. In this manner, the segment sections that extend away from the fork enclose a recess or opening, the shape of which changes when compressed or expanded. The opening can be circular, for example. Preferably, the opening has the shape of a geometric kite, in particular a rhombus.

In such a case, the segment sections that extend away from the fork extend transversely to the connection direction defined by the row, at an angle of 30° to 60°, for example. The segment sections that enable the individual housings to move relative to each other can extend perpendicularly to the row, although this is not necessary. It suffices for the section that extends transversely to the row to intersect the direction defined by the row.

Preferably, the segment sections, which are created by the forking and function as adapter elements, have a reduced thickness and are therefore less wide or thick than the segment section that extends from the housing to the fork. Particularly preferably, the thickness of the segment sections, which are formed by the forking, is reduced by at least half compared to the preceding segment section.

Preferably, the connection contacts of a heater according to the present invention extend out of the heater core and into the recess. The contacts can be designed as contact blades, for example. Accordingly, the contacts of the plug-in connector are preferably designed as contact openings into which the contacts of the heater extend. Basically, however, the plug-in connector can also be provided with male contacts, and the contacts of the heater can be designed accordingly, as matching contact openings.

Further details and advantages of the invention are explained using embodiments, with reference to the attached drawings. Parts that are identical or similar are labeled using the same reference numerals. In the drawings.

Figure 1:
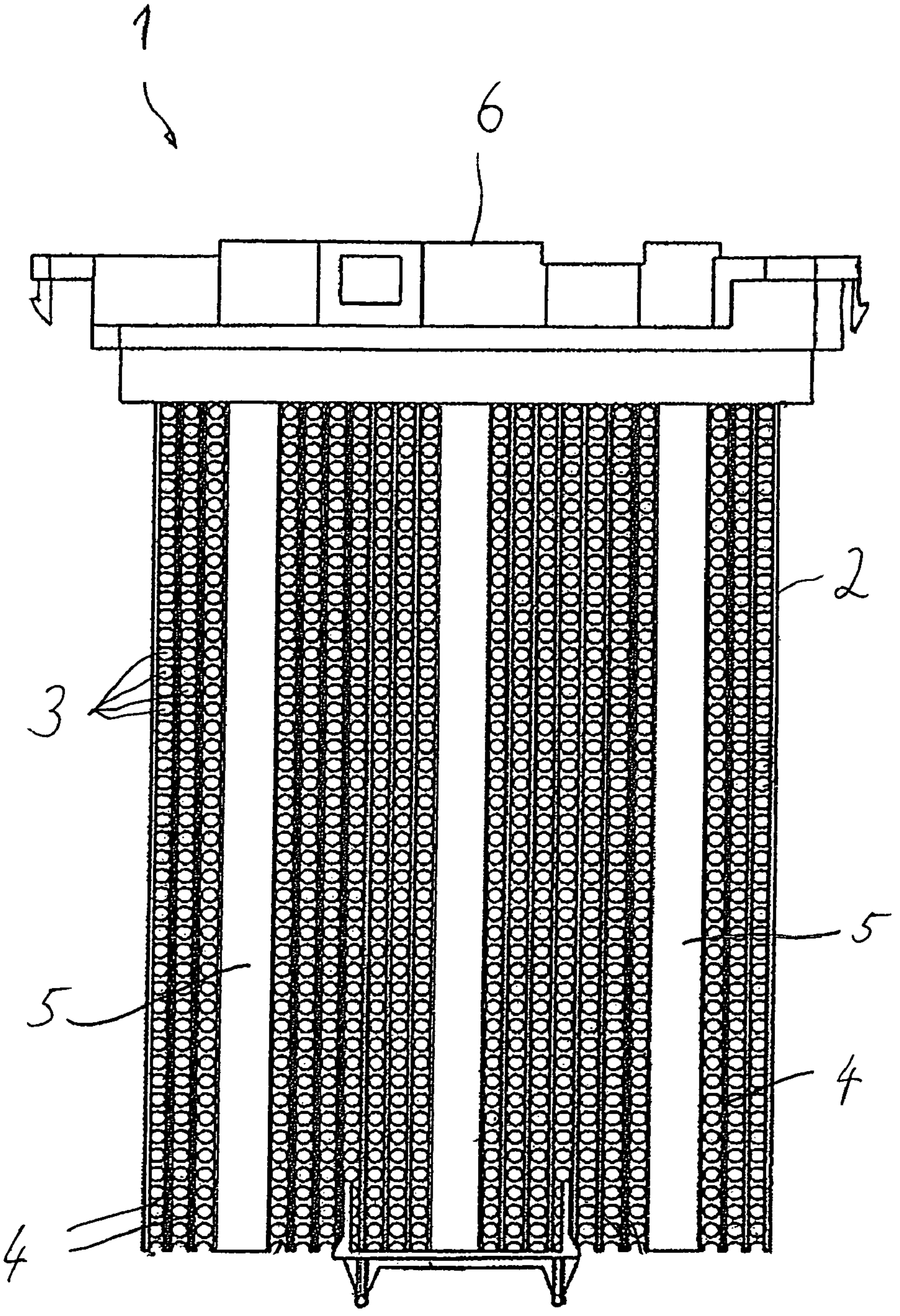
FIG. 1 shows an embodiment of a motor vehicle heating system.
Figure 2:
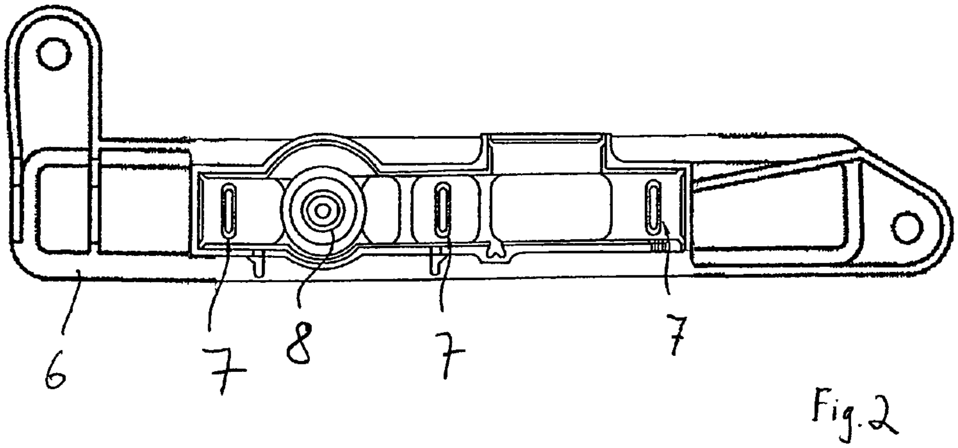
FIG. 2 shows a further view of FIG. 1.
Figure 3:
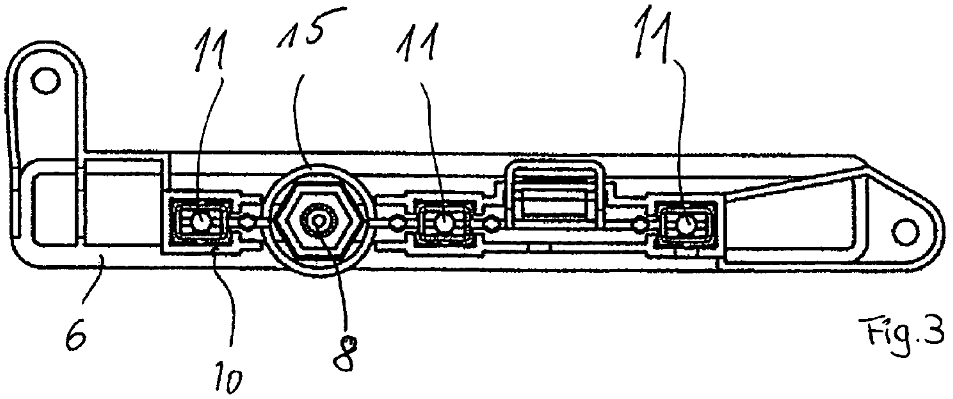
FIG. 3 shows an embodiment of a plug-in connector that fits with the heater that is depicted.
Figure 4:
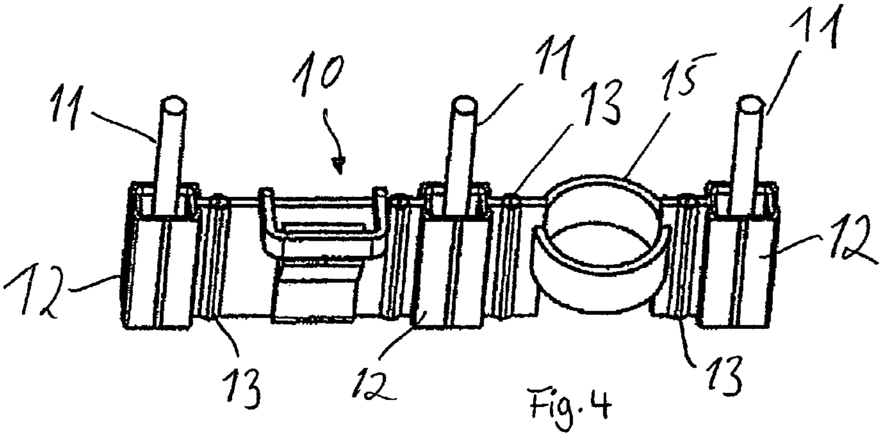
FIG. 4 shows a view of the heater with plug-in connector.
Figure 5:
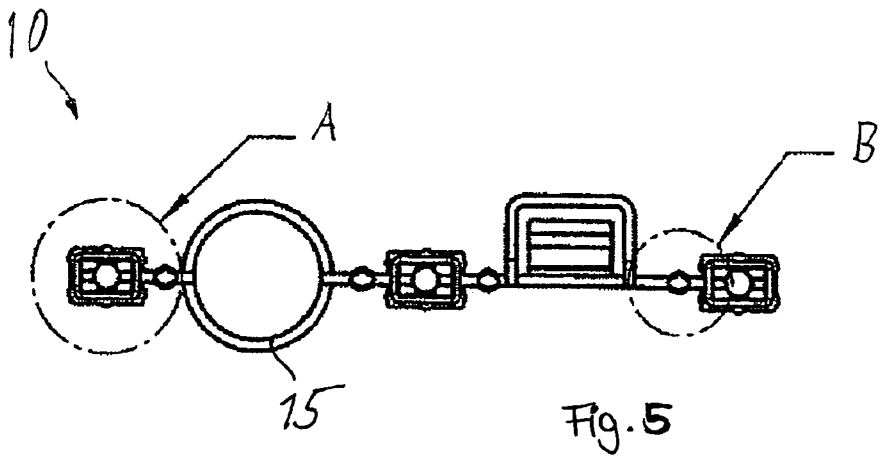
FIG. 5 shows a further view of FIG. 3.
Figure 6:
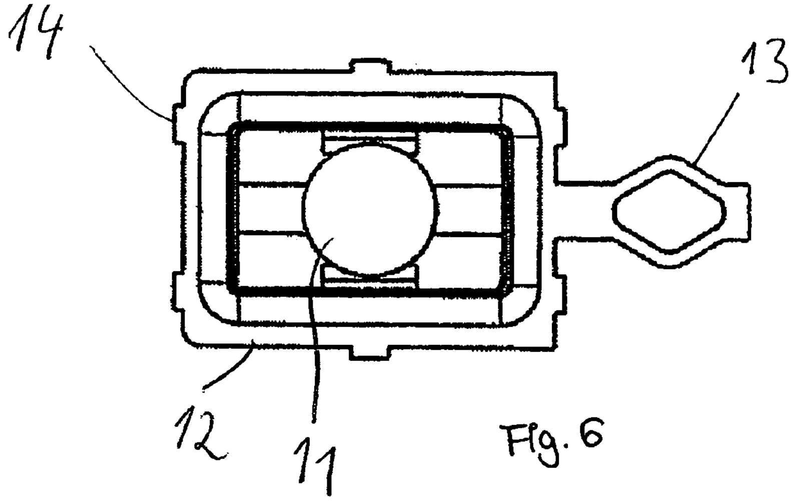
FIG. 6 shows a detailed view of FIG. 5.
Figure 7:
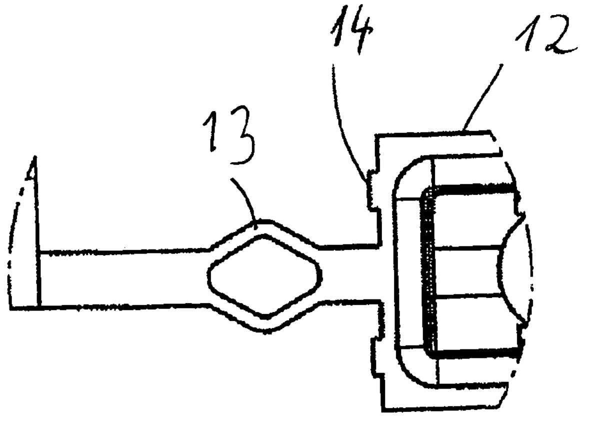
FIG. 7 shows a further detailed view of FIG. 4.

FIGS. 1 and 2 show an embodiment of a motor vehicle heating system 1 which, in combination with a plug-in connector depicted in FIGS. 3 and 5 through 7, forms a heating system. FIG. 4 shows the heater with the plug-in connector inserted and, therefore, a view of the heating system.

Heater 1 includes a heater core 2, through which a fluid flow to be heated flows. Heater core 2 is preferably manufactured as an extruded part. Openings 3 can be formed in the extruded part e.g. via stamping or laser-beam cutting, thereby enabling a fluid flow, which is to be heated, to flow through the extruded part transversely to its extrusion direction. The extruded part can include heat-dissipation fins, to improve the heat transfer. Preferably, the extruded part that forms heater core 2 includes tubes 5, in which electrical heating elements (not depicted) are located. Tubes 5 are preferably square tubes. Advantageously, they can be compressed after the heating elements are installed, to improve the thermal coupling.

The heating elements are preferably composed of a PTC material, that is, a material having a positive temperature coefficient. PTC materials that change their electrical resistance abruptly at a critical temperature are preferred. Ceramic PTC materials are suitable in particular, for instance those based on barium titanate.

Heater core 1 carries, on a narrow side, a top part 6 that forms a receptacle for a plug-in connector. Advantageously, top part 6 can be made of plastic e.g. as an injection molded part. It is also possible to manufacture top part 6 out of metal e.g. aluminum.

In the embodiment shown, the heating elements are connected to potential using contact pins that extend, as contact blades 7, into the recess formed by top part 6. A ground connection is established by a ground pin 8 which is located in the receptacle and is electrically connected to the heat-dissipation body—through which a substance can flow—of the heater. Contact blades 7 are situated in a row. Ground pin 8 is situated in a row with the contact blades.

Heater 1 can be connected to the electrical system of a motor vehicle using plug-in connector 10 depicted in FIGS. 3 through 7. Plug-in connector 10 of the embodiment shown has three contacts, from each of which a connecting line 11 extends. In the embodiment shown, the contacts are depicted as contact openings that accommodate contact blades 7 of heater 1.

Each of the contacts of plug-in connector 10 is enclosed individually by a housing 12. Housings 12 are interconnected via mechanical adapter elements 13 which enable housings 12 to be moved relative to each another to adapt to the position of contacts 7 of heater 1. Adapter elements 13 are designed as sections of segments that interconnect individual housings 12. Adapter elements 13 are shown in particular in FIG. 6 which shows an enlargement of section A in FIG. 5, and in FIG. 7 which shows an enlargement of section B in FIG. 5.

As adapter elements 13, the segments each have at least one section that extends transversely to the connection direction, that is, transversely to the direction of the row of housings 12. As a result, the segments can easily expand in order to increase the distance between adjacent housings 12, or they can contract in order to reduce the distance between adjacent housings 12.

In the embodiment shown in FIGS. 3 through 7, adapter elements 13 are formed by the segment forking; the segment sections formed as a result extend away from each other transversely to the connection direction and reconnect in an adjacent second section. In this manner, the segment sections formed by adapter element 13 form an opening that is preferably diamond-shaped. The segment sections that form adapter element 13 preferably have a reduced thickness e.g. a thickness that is less than half, and, in particular, less than ⅓ the thickness of the adjacent segment.

Individual housings 12 of plug-in connector 10 can be provided with guide- or clamping elements 14 to facilitate correct insertion into the receptacle of heater 1. In the embodiment shown, housings 12 each have a wall that is closed in the circumferential direction, and therefore the contacts of plug-in connector 10 are each enclosed all the way around by respective housing 12. The housings may also be designed to include interrupted walls.

Using plug-in connector 10 described herein, only those potential connections of heater 1 that are designed as contact blades 7 are contacted. Ground connection 8 of heater 1 is contacted separately e.g. using a Radsok contact. Plug-in connector 10 therefore includes a ring 15 between two housings 12, which can extend through ground connection 8 of heater 1. In this manner, ground connector 8 can be contacted independently of plug-in connector 10. An adapter element 13 is located between ring 15 and housing 12 on either side of ring 15. The ring thickness is preferably twice as great as the thickness of the segments of adapter elements 13.

Figure 8:
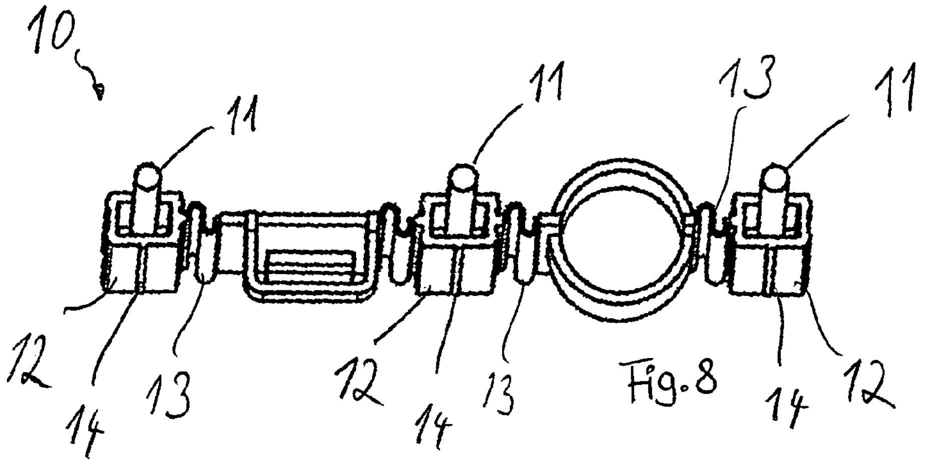
FIG. 8 shows a further embodiment of a plug-in connector according to the invention.
Figure 9:
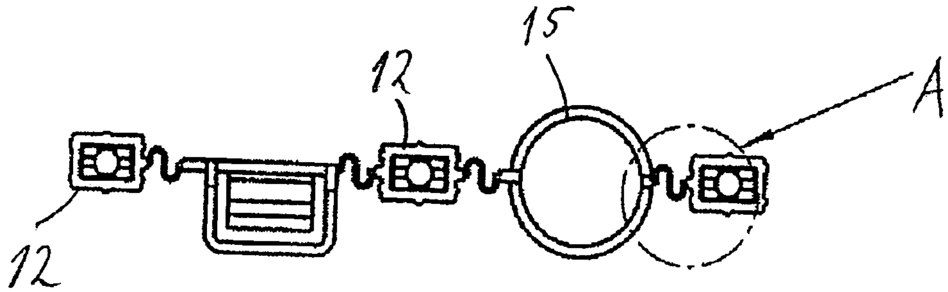
FIG. 9 shows a further view of FIG. 8.
Figure 10:
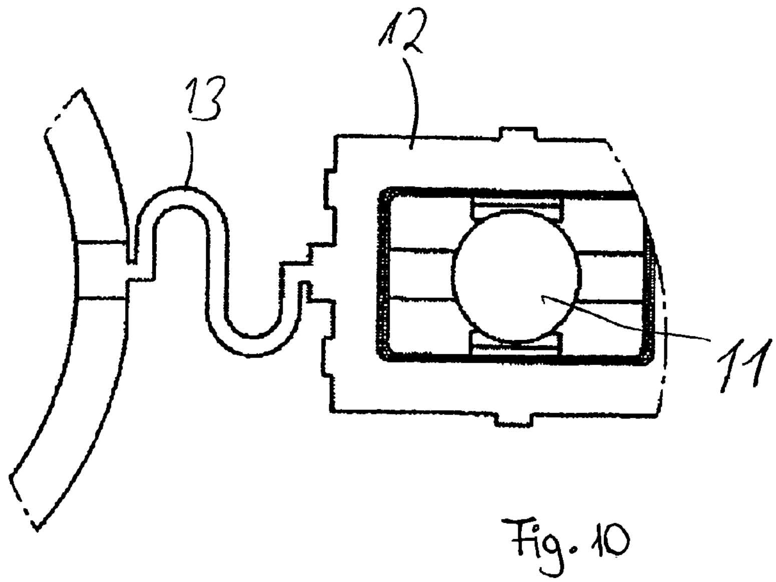
FIG. 10 shows a detailed view of FIG. 9.

A further embodiment of a plug-in connector 10 is shown in FIGS. 8 through 10. This embodiment differs from the above-described embodiment only in terms of the design of mechanical adapter elements 13. In the embodiment shown in FIGS. 8 through 10, adapter elements 13 are designed as segments that are curved in the shape of an “S” and interconnect housings 12 of plug-in connector 10. The design of adapter elements 13 as segments curved in the shape of an “S” is shown particularly clearly in FIG. 10 which is an enlarged view of section A in FIG. 9.

Figure 11:
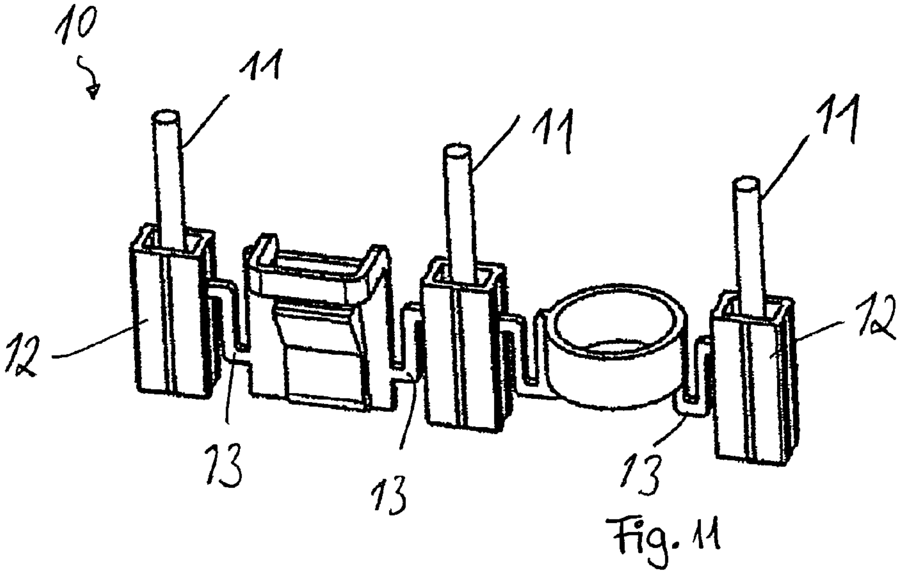
FIG. 11 shows a further embodiment of a plug-in connector.
Figure 12:
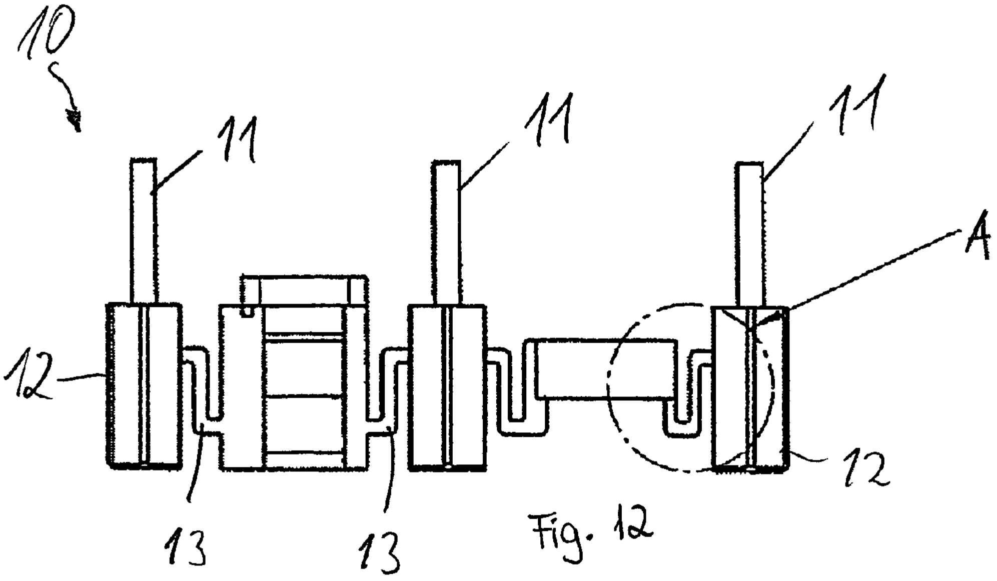
FIG. 12 shows a further view of FIG. 11.
Figure 13:
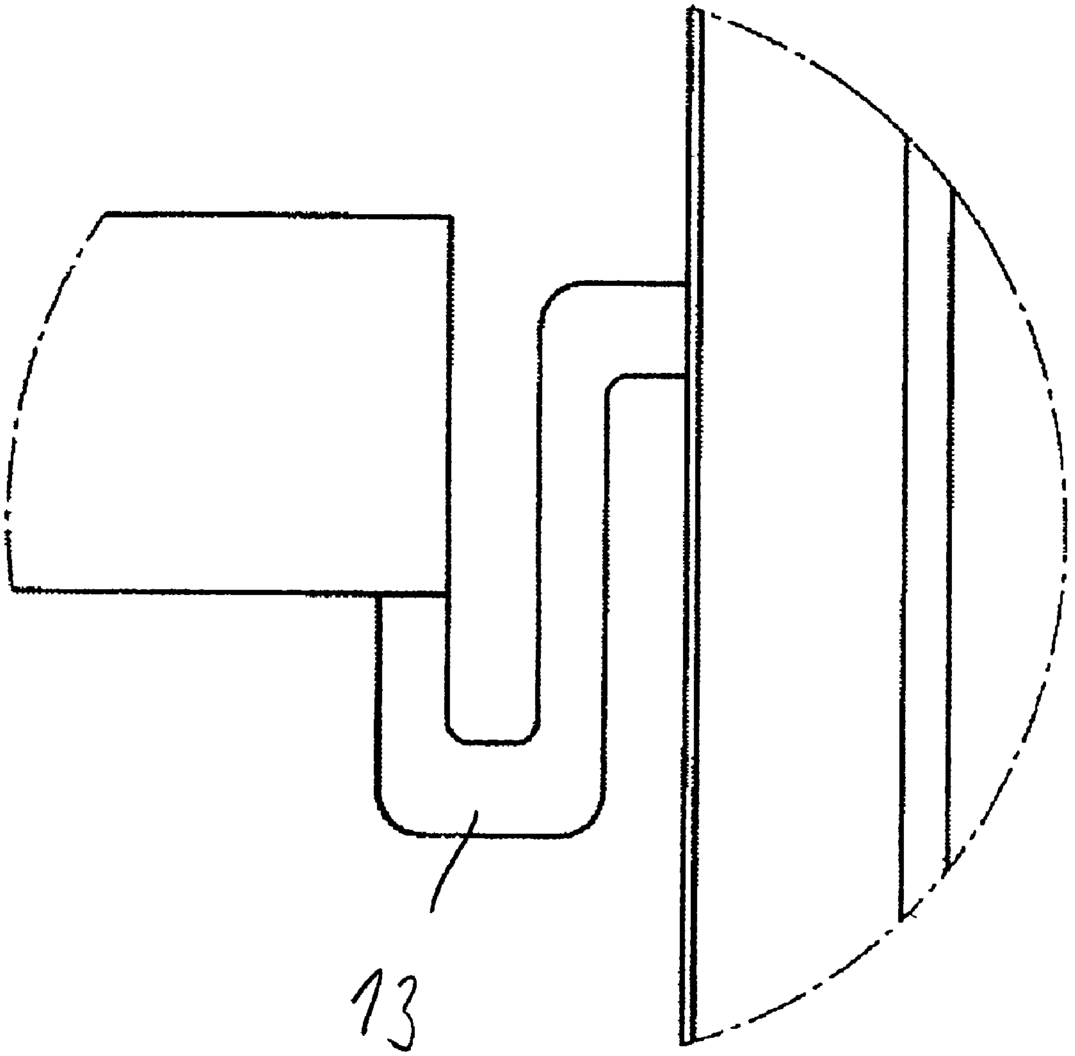
FIG. 13 shows a detailed view of FIG. 12.

A further embodiment of a plug-in connector is shown in FIGS. 11 through 13. FIG. 13 shows an enlargement of section A in FIG. 12. This embodiment differs from the above-described embodiments likewise only in terms of the design of mechanical adapter elements 13.

In the embodiment shown in FIGS. 11 through 13, adapter elements 13 are likewise designed as segments curved in the shape of an “S”. The curves are rounded to less of an extent than those in the embodiment depicted in FIGS. 8 through 10, and are approximately angular in shape. In addition, adapter elements 13 in FIGS. 11 through 13, that is, the S-shaped curvature, lie in a plane that is defined by the direction of the row of individual housings 12 and the plug-in direction of plug-in connector 10, while, in the embodiment depicted in FIGS. 8 through 10, the S-shaped curvature is oriented transversely thereto. In this embodiment, the segment sections that extend transversely to the direction defined by the row of housings 12 therefore extend in the plug-in direction of plug-in connector 10.

REFERENCE NUMERALS

1 Motor vehicle heating system
2 Heater core
3 Opening
4 Heat-dissipation fins
5 Tube
6 Top part
7 Contact blade
8 Ground pin
10 Plug-in connector
11 Connecting line
12 Housing
13 Adapter element
14 Guide- or clamping element
15 Ring

The invention claimed is:

1. A motor vehicle heating system comprising a heater (1) that has a heater core (2), through which a fluid flow to be heated can flow and which comprises a plurality of heating elements, and a top part (6) which is placed on the heater core (2) and forms a receptacle for a plug-in connector (10), and a plug-in connector (10) that fits into the receptacle, for connecting the heater (1) to the electrical system of a motor vehicle, wherein the plug-in connector (10) includes a plurality of contacts, which are situated in a row, for contacting contacts (7) of the heater (1), characterized in that the plug-in connector (10) includes a plurality of housings (12), each of which encloses one or two contacts of the plug-in connector (10), wherein the housings (12) are interconnected via mechanical adapter elements (13) which enable adjacent housings (12) to be moved toward one another or away from one another to adapt to the position of the contacts (7) of the heater (1).

2. The motor vehicle heating system according to claim 1, characterized in that the adapter elements (13) are designed as sections of segments that interconnect the housings (12).

3. The motor vehicle heating system according to claim 2, characterized in that the segments include, as adapter element (13), at least one section that extends transversely to the row.

4. The motor vehicle heating system according to claim 2, characterized in that the segments include, as adapter element (13), at least one C-shaped or V-shaped section.

5. The motor vehicle heating system according to claim 4, characterized in that the segments include, as adapter element (13), two C-shaped or V-shaped sections.

6. The motor vehicle heating system according to claim 5, characterized in that the two C-shaped or V-shaped sections form an S-shaped curvature of the segment.

7. The motor vehicle heating system according to claim 5, characterized in that the two C-shaped or V-shaped sections enclose an opening.

8. The motor vehicle heating system according to claim 7, characterized in that the opening has the shape of a kite, preferably a rhombus.

9. The motor vehicle heating system according to claim 7, characterized in that the segment sections enclosing the recess have a reduced thickness.

* * * * *